US010454758B2

United States Patent
Boutros et al.

(10) Patent No.: US 10,454,758 B2
(45) Date of Patent: Oct. 22, 2019

(54) EDGE NODE CLUSTER NETWORK REDUNDANCY AND FAST CONVERGENCE USING AN UNDERLAY ANYCAST VTEP IP

(71) Applicant: Nicira, Inc., Palo Alto, CA (US)

(72) Inventors: Sami Boutros, Union City, CA (US); Benjamin C. Basler, Los Altos, CA (US); Ronghua Zhang, San Jose, CA (US); Jerome Catrouillet, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 107 days.

(21) Appl. No.: 15/443,974

(22) Filed: Feb. 27, 2017

(65) Prior Publication Data

US 2018/0062914 A1    Mar. 1, 2018

Related U.S. Application Data

(60) Provisional application No. 62/382,229, filed on Aug. 31, 2016.

(51) Int. Cl.
*G01R 31/08*  (2006.01)
*G06F 11/00*  (2006.01)
(Continued)

(52) U.S. Cl.
CPC ...... *H04L 41/0668* (2013.01); *H04L 12/4641* (2013.01); *H04L 45/16* (2013.01);
(Continued)

(58) Field of Classification Search
CPC . H04L 41/0668; H04L 12/4641; H04L 45/16; H04L 45/28; H04L 45/586; H04L 616/2592; H04L 69/40
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| EP | 1653688 | 5/2006 |
| EP | 3013006 | 4/2016 |

(Continued)

OTHER PUBLICATIONS

Non-Published Commonly Owned U.S. Appl. No. 15/011,430, filed Jan. 29, 2016, 66 pages, Nicira, Inc.

(Continued)

*Primary Examiner* — Stephen M D Agosta
(74) *Attorney, Agent, or Firm* — Adeli LLP (57) ABSTRACT

Some embodiments provide a method for providing redundancy and fast convergence for modules operating in a network. The method configures modules to use a same anycast inner IP address, anycast MAC address, and to associate with a same anycast VTEP IP address. In some embodiments, the modules are operating in an active-active mode and all nodes running modules advertise the anycast VTEP IP addresses with equal local preference. In some embodiments, modules are operating in active-standby mode and the node running the active module advertises the anycast VTEP IP address with higher local preference.

20 Claims, 7 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 12/24* (2006.01)
*H04L 12/761* (2013.01)
*H04L 29/12* (2006.01)
*H04L 12/46* (2006.01)
*H04L 12/713* (2013.01)
*H04L 12/707* (2013.01)
*H04L 12/703* (2013.01)
*H04L 29/14* (2006.01)

(52) U.S. Cl.
CPC ............ *H04L 45/22* (2013.01); *H04L 45/28* (2013.01); *H04L 45/586* (2013.01); *H04L 61/2592* (2013.01); *H04L 69/40* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2* | 1/2014 | Vobbilisetty ............ H04L 49/70 370/328 |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,021,066 B1 | 4/2015 | Singh et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,647,883 B2 | 5/2017 | Neginhal et al. |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 2001/0043614 A1 | 11/2001 | Viswanadham et al. |
| 2002/0067725 A1* | 6/2002 | Oguchi ............... H04L 12/4641 370/390 |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |

(56) References Cited

U.S. PATENT DOCUMENTS

| | | |
|---|---|---|
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0149964 A1 | 6/2011 | Judge et al. |
| 2011/0149965 A1 | 6/2011 | Judge et al. |
| 2011/0194567 A1* | 8/2011 | Shen .................. H04L 12/4679 370/409 |
| 2011/0205931 A1 | 8/2011 | Zhou et al. |
| 2011/0261825 A1 | 10/2011 | Ichino |
| 2011/0283017 A1* | 11/2011 | Alkhatib ............ H04L 12/4641 709/244 |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1* | 2/2013 | Koponen ................ H04L 12/66 370/255 |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1* | 10/2013 | Qu .......................... H04L 45/74 370/395.53 |
| 2013/0268799 A1* | 10/2013 | Mestery ................ H04L 67/10 714/4.2 |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1* | 12/2013 | Mithyantha ............ H04L 45/02 709/238 |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1* | 5/2014 | Zhang .................... H04L 45/74 370/392 |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1* | 12/2014 | Ghanwani ............... H04L 45/64 709/223 |
| 2014/0376550 A1 | 12/2014 | Khan et al. |
| 2015/0016300 A1* | 1/2015 | Devireddy .......... H04L 41/0893 370/254 |
| 2015/0063360 A1 | 3/2015 | Thakkar et al. |
| 2015/0089082 A1 | 3/2015 | Patwardhan et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2016/0105471 A1* | 4/2016 | Nunes .................. H04L 12/4633 709/228 |

(56) References Cited

U.S. PATENT DOCUMENTS

| | | |
|---|---|---|
| 2016/0119229 A1 | 4/2016 | Zhou |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1* | 9/2016 | Li .................. H04L 45/42 |
| 2016/0294612 A1 | 10/2016 | Ravinoothala et al. |
| 2016/0344586 A1 | 11/2016 | Ganichev et al. |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0126497 A1 | 5/2017 | Dubey et al. |
| 2017/0230241 A1 | 8/2017 | Neginhal et al. |
| 2017/0317919 A1 | 11/2017 | Fernando et al. |
| 2018/0006943 A1 | 1/2018 | Dubey |
| 2018/0097734 A1 | 4/2018 | Boutros et al. |
| 2018/0367442 A1 | 12/2018 | Goliya et al. |

FOREIGN PATENT DOCUMENTS

| | | |
|---|---|---|
| JP | 2003069609 | 3/2003 |
| JP | 2003124976 | 4/2003 |
| JP | 2003318949 | 11/2003 |
| WO | 2005112390 | 11/2005 |
| WO | 2008095010 | 8/2008 |
| WO | 2013055697 A1 | 4/2013 |
| WO | 2013184846 | 12/2013 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

OTHER PUBLICATIONS

Non-Published Commonly Owned U.S. Appl. No. 15/197,713, filed Jun. 29, 2016, 39 pages, Nicira, Inc.

Non-Published Commonly Owned U.S. Appl. No. 15/445,922, filed Feb. 28, 2017, 29 pages, Nicira, Inc.

Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.

Aggarwal, R. et al., Data Center Mobility based on E-VPN, BGP/MPLS IP VPN, IP Routing and NHRP; draft-raggarwa-data-center-mobility-05.txt, Jun. 10, 2013, 24 pages, Internet Engineering Task Force, IETF, Standardworkingdraft, Internet Society (ISOC) 4, Rue Des Falaises CH-1205, Geneva, Switzerland.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation, Apr. 2005, 14 pages, USENIX Association.

Dobrescu, Mihai, et al., "RouteBricks: Exploiting Parallelism to Scale Software Routers," SOSP '09, Proceedings of the ACM SIGOPS 22nd Symposium on Operating Systems Principles, Oct. 2009, 17 pages, ACM New York, NY.

Dumitriu, Dan Mihai, et al. (U.S. Appl. No. 61/514,990), "Method and Apparatus for Computing", filed Aug. 4, 2011, 31 pages.

Handley, Mark, et al., "Designing Extensible Ip Router Software," Proc. of NSDI, May, 2005, 14 pages.

Kim, Changhoon, et al., "Revisiting Route Caching: The World Should be Flat," in Proc. of PAM, Month Unknown, 10 pages.

Kponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Lakshminarayanan, Karthik, et al., "Routing as a Service," Month Unknown, 2004, 15 pages, Berkeley, California.

Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.

Maltz, David A., et al., "Routing Design in Operational Networks: A Look from the Inside," SIGCOMM '04, Aug. 30-Sep. 3, 2004, 14 pages, ACM, Portland, Oregon, USA.

Pelissier, Joe, "Network Interface Virtualization Review," Jan. 2009, 38 pages.

Rosen, E, et al., "Applicability Statement for BGPMPLS IP Virtual Private Networks (VPNs)," The Internet Society, RFC 4365, Feb. 2006, 32 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 2013, 15 pages, IEEE.

Wang, Yi, et al., "Virtual Routers on the Move: Live Router Migration as a Network—management Primitive," SIGCOMM 08, Aug. 17-22, 2008, 12 pages, ACM, Seattle, Washington, USA.

Vmware, Inc., "Vmware® NSX Network Virtualization Design Guide," 2013, 32 pages, Item No. VMW-NSX-NTWK-VIRT-DESN-GUIDE-V2-101, Palo Alto, CA, USA.

PCT International Search Report and Written Opinion dated Nov. 6, 2017, for commonly owned International Patent Application PCT/US17/48787, 11 pages, Nicira, Inc.

Sajassi, Ali, et al., "Integrated Routing and Bridging in EVPN draft-sajassi-12vpn-evpn-inter-subnet-forwarding-04", Jul. 4, 2014, 24 pages.

\* cited by examiner

EDGE NODE CLUSTER NETWORK REDUNDANCY AND FAST CONVERGENCE USING AN UNDERLAY ANYCAST VTEP IP

BACKGROUND

Networks provide services at service nodes. Clusters of service nodes are often used to provide redundancy so that service is not interrupted upon the failure of a single service node. During a failover process, the process of switching from a failed node to a redundant node, packets destined for the failed node may be dropped or may not be provided with the service. Therefore, methods for providing redundancy while minimizing failover time are needed.

BRIEF SUMMARY

Some embodiments provide a method for providing redundancy and fast convergence to modules (e.g., service routers) executing in edge nodes. In some embodiments the method is performed by a management plane that centrally manages the network (e.g., implemented in a network controller). The method, in some embodiments configures a set of service routers executing in edge nodes to use a same anycast inner interne protocol (IP) address and a same anycast inner media access control (MAC) address. In some embodiments, the method configures edge nodes on which the set of service routers are executing to use a same set of anycast virtual extensible local area network tunnel endpoint (VTEP) IP addresses. The method in some embodiments configures edge nodes to advertise the anycast inner IP and anycast inner MAC address as reachable through at least one anycast VTEP IP address.

In some embodiments, the method configures the service routers to act in active-standby mode in which one service router acts as an active service router and other service routers act as standby service routers in case the active service router is no longer accessible (e.g., the active service router fails or a connection to the active service router fails). In some embodiments, the method accomplishes this by configuring an edge node on which an active service router executes to advertise the anycast VTEP IP address with a higher local preference. In these embodiments, when the edge node fails, a switch connected to the edge node advertises that the anycast VTEP IP address is no longer reachable at the edge node. In other embodiments, the method configures the modules in active-active mode by configuring all edge nodes to advertise the anycast VTEP IP address with the same local preference.

In some embodiments, the method takes advantage of convergence of an underlay network to decrease failover times for redundant modules. Convergence time in the underlay network in some embodiments is based on link-failure detection protocols (e.g., bidirectional forwarding detection (BFD)) between the physical switches and machines on which the modules execute (e.g., an edge node or the host on which an edge node executes). Such underlay network failure detection in most cases will be much faster than software based methods operating between modules (50 ms vs. 1 second). Faster detection and fast convergence times for the hardware allows for decreased failover time for the modules.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for providing redundancy and fast convergence to modules (e.g., service routers) executing in edge nodes. In some embodiments, the method is performed by a management plane that centrally manages the network (e.g., implemented in a network controller). The method, in some embodiments, configures a set of service routers executing in edge nodes to use a same anycast inner internet protocol (IP) address and a same anycast inner media access control (MAC) address. In some embodiments, the method configures edge nodes on which the set of service routers are executing to use a same set of anycast virtual extensible local area network tunnel endpoint (VTEP) IP addresses. The method configures edge nodes to advertise the anycast inner IP and anycast inner MAC address as reachable through at least one anycast VTEP IP address in some embodiments.

Figure 1:
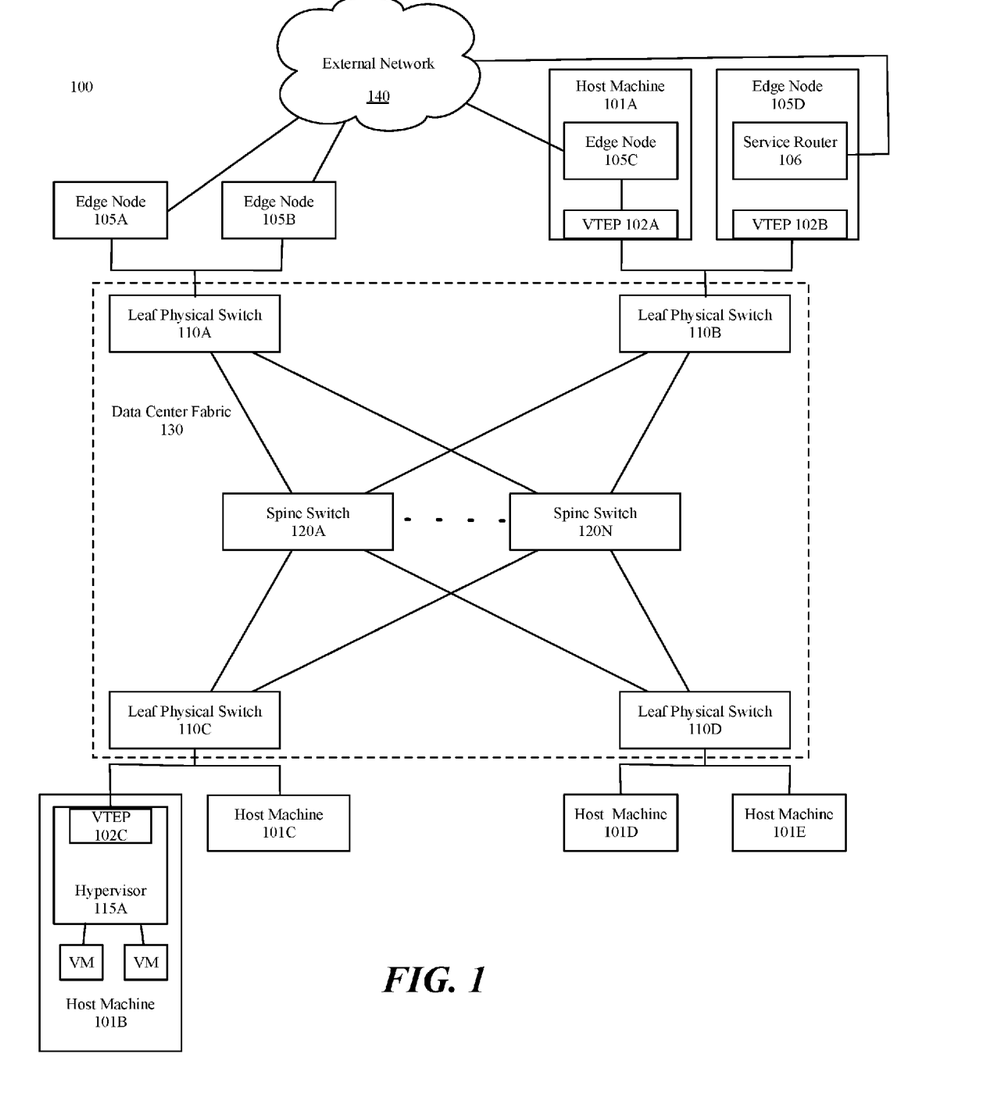
FIG. 1 illustrates a network that includes service modules, edge nodes, leaf switches, and spine switches in which the invention operates.

FIG. 1 illustrates a network system 100 in which some embodiments of the invention are implemented. FIG. 1 includes a number of host machines 101A-E, virtual extensible local area network tunnel endpoints (VTEPs) 102A-C, edge notes 105A-D, a service router 106, leaf switches 110A-D, hypervisor 115A, spine switches 120A-N, a data center fabric 130, and an external network 140. For simplicity, FIG. 1 only shows host machines 101A and B and edge node 105D with internal component, but one of ordinary skill in the art would understand that that other host machines and edge machines may contain similar, additional, or alternative elements.

Edge nodes 105A-D are connected to external network 140 and provide virtual machines or other data compute nodes connected to data center fabric 130 access to external network 140 by hosting service routers (e.g., service router 106). Service routers (SRs) may be implemented in a namespace, a virtual machine, or as a virtual routing and forwarding (VRF) module in different embodiments. Service routers provide routing services and, in some embodiments, a number of stateful (e.g., firewall, NAT, etc.) or stateless services (e.g., access control lists (ACLs)). In different embodiments, edge nodes 105A-D may be implemented as virtual machines (sometimes referred to as Edge VMs), in other types of data compute nodes (e.g., namespaces, physical hosts, etc.), or by using the Linux-based datapath development kit (DPDK) packet processing software (e.g., as a VRF in the DPDK-based datapath).

Edge nodes (e.g., edge node 105D) in some embodiments terminate tunnels (e.g., tunnels defined by a network manager). In some embodiments, some edge nodes (e.g., edge node 105C) make use of a VTEP of a host machine on which they execute while others implement their own VTEP when the edge node executes in a dedicated server. In some embodiments, edge nodes may be run on bare metal (e.g., directly on a server or host) or as a virtual machine form factor running on top of a hypervisor. One of ordinary skill in the art will understand that a network may include a number of edge nodes operating in any combination of the above modes.

Leaf physical switches 110C and 110D, in some embodiments, are part of data center fabric 130 and provide the VMs executing on host machines 101B-E access to spine switches 120 A-N and—through leaf physical switches 110A and 110B and edge nodes 105A-D—to external network 140. Leaf switches in some embodiments may be implemented as physical top of rack switches. In some embodiments, leaf switches and spine switches run internal gateway protocols (IGPs) (e.g., open shortest path first (OSPF), routing information protocol (RIP), intermediate system to intermediate system (IS-IS), etc.) to direct packets along a shortest path to a packet destination.

Host machines 101B-E in some embodiments host multiple VMs that use the edge nodes and service routers to access external network 140. VMs or other DCNs may be run on top of a hypervisor executing a managed switching element (not shown) that implements a VTEP and a virtual distributed router (VDR) to allow for overlay network and logical packet processing.

One of ordinary skill in the art would understand that the underlying network structure may be implemented in any number of ways that are consistent with the spirit of the invention. The particular network structure should not be construed as limiting the invention but is used solely for illustrative purposes.

Figure 2:
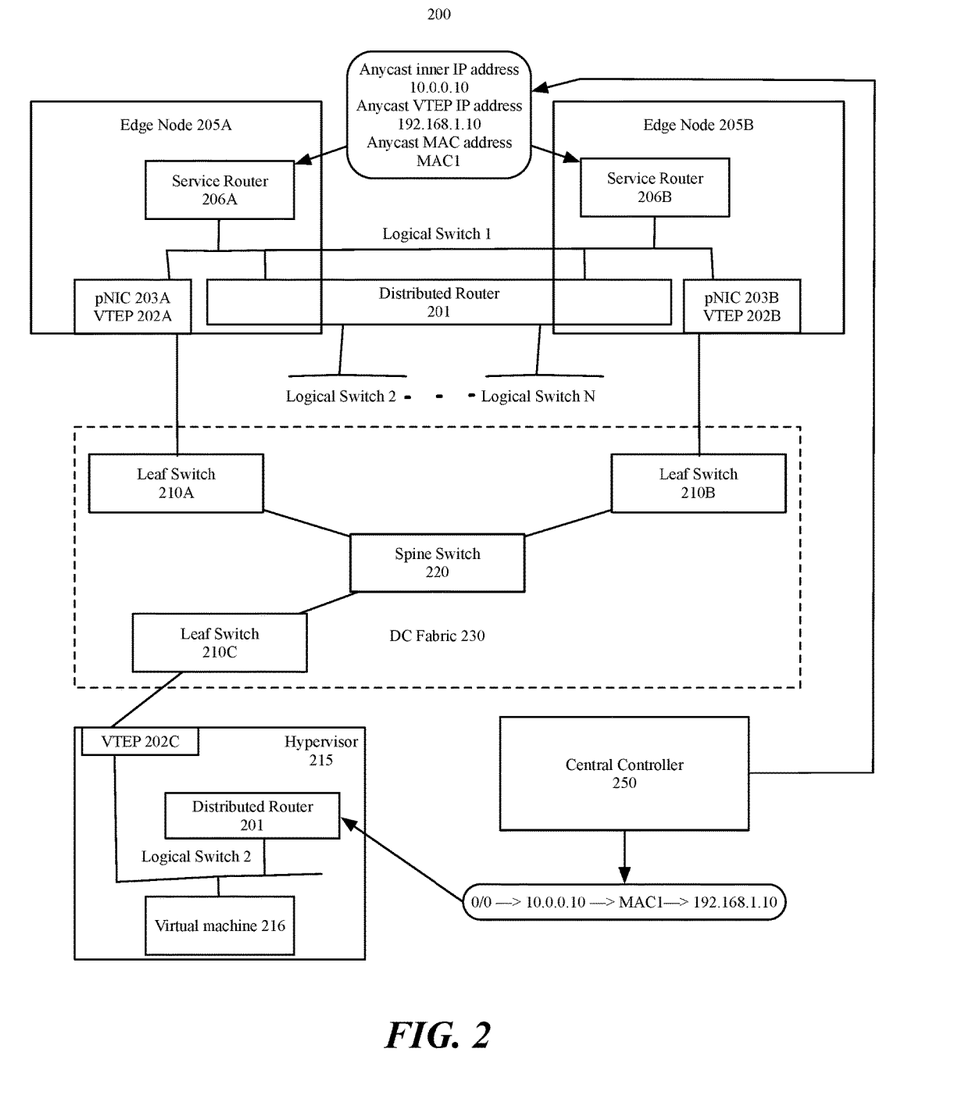
FIG. 2 illustrates a set of service modules using a same set of anycast addresses in a system configured as in FIG. 1.

FIG. 2 illustrates an instance of a set of service routers 206A-B executing on edge nodes 205A-B. FIG. 2 also illustrates a distributed router (DR) that spans edge nodes 205A-B and hypervisor 215. Hypervisor 215 also runs virtual machine 216 and terminates a tunnel at VTEP 202C. FIG. 2 also shows central controller 250 configuring a default route for DR 201 on hypervisor 215, and configures service routers 206A-B to use the anycast inner IP, MAC, and VTEP (outer) IP address. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound (e.g., edge nodes 205A-B). The DR is responsible for first-hop distributed routing between logical switches and/or other logical routers that are logically connected to the logical router. The SRs of some embodiments are responsible for delivering services that are not implemented in a distributed fashion (e.g., some stateful services).

Service routers 206A-B are shown connecting to logical switch 1. Service routers 206A-B in some embodiments are a subset of a set of SRs that provide access to external networks. Distributed router 201 connects to a plurality of logical switches (e.g., logical switches 1-N). Logical switches 2-N may be connected to VMs executing on any number of host machines. The VMs in some embodiments route traffic to an outside network through service routers 206A-B or a different set of SRs. Further details of possible configurations may be found in U.S. Non-Provisional patent application Ser. No. 14/814,473, published as United States Patent Publication 2016/0226754, which is hereby incorporated by reference.

As shown, SRs 206A-B are configured to use a same anycast inner IP address, anycast VTEP (outer) address, and anycast media access control (MAC) address. Anycast addressing allows a same address to be used for multiple destinations (in some embodiments of this invention the multiple destinations are redundant destinations). A packet sent to an anycast address is forwarded to a nearest node (also referred to as a closest node or along a shortest path) according to an IGP (e.g., OSPF, RIP, IS-IS, etc.). Such a nearest node along a route, in some embodiments, is calculated based on administrative distance values, used to determine priority, with larger values indicating lower priority types of route.

Service routers 206A-B may be implemented in active-active mode or active-standby mode. In active-active SRs are treated as equals for routing purposes (i.e., advertised with a same preference or administrative distance). Packet flows in active-active mode are directed to a particular SR based on some set of criteria (e.g., a load balancing criteria, equal-cost multi-pathing (ECMP), anycast routing protocol, etc.). Failure of a SR in active-active mode in some embodiments is detected by a bidirectional forwarding detection (BFD) session running between an edge node on which the SR executes and a switch to which the edge node is connected. After detection of the failure the switch no longer advertises the availability of the service router at the edge node for which the connection failed and the underlay network converges on remaining SRs as the shortest or lowest cost path to the anycast IP address. The system thus achieves redundancy and fast convergence by using an IGP and a same anycast address for all SRs. The specific steps are further discussed in relation to FIGS. 4-6.

In some embodiments of the invention, SRs 206A-B are implemented in active-standby mode. In active-standby mode one service router in a set of service routers is configured to act as the active service router to which traffic destined for the set of service routers is directed. Such an active-standby mode may be useful when service routers provide stateful services that require a single service router to provide a set of services for each packet flow. In some situations, the active service router in such an active-standby mode maintains the state of all the flows. In some embodiments state information is periodically pushed to (or pulled by) the standby service routers to provide the set of services if the active service router fails. In active-standby mode the edge node hosting the active SR advertises its anycast VTEP IP address with a higher preference (e.g., lower administrative distance) than the edge node hosting the standby SR such that the active SR is always the "nearest" SR when both SRs are available.

In order to provide redundancy with fast convergence, some embodiments use bidirectional forwarding detection (BFD) or similar protocols for monitoring whether connections between leaf switches and edge nodes (and ultimately to the service routers) are functioning. Such protocols can have very short detection times (e.g., 50 ms). If a connection to an edge node hosting an active SR fails, routing information for the anycast addresses used by the active (failed) SR and the underlying network can converge on the use of the standby SR (as the available SR with the anycast addresses) at the same rate as the underlying network convergence, which in some embodiments is considerably faster than methods that rely on communication between the SRs. In some embodiments, the update is based on a notification from the BFD session.

This fast convergence can be contrasted with a process that relies on BFD sessions that run between SRs. BFD sessions that run between SRs to detect SR failure in both active-active and active-standby mode send packets less aggressively in order to avoid a false positive (i.e., detecting a failure that has not happened) based on a link failure in the underlay network that is subsequently corrected within an acceptable time. Even after a BFD session detects an actual failure, the SR must perform software processes to determine the appropriate action to take and then must send out a gratuitous address resolution protocol (GARP) packet that alerts all the servers and hypervisors of the new association of the MAC address of the failed SR with the IP address of the alternative SR. This process can take ten seconds or more because of the large number (hundreds or even thousands) of servers attached to a particular leaf physical switch as opposed to the method using the underlay network convergence which relies only on advertising the updated anycast address availability to the physical switches in the DC fabric.

One of ordinary skill in the art would understand that this method could be used to provide redundancy with fast convergence time to other types of module clusters that provide stateful or stateless services and is not limited to service routers in edge nodes.

Distributed router 201 is illustrated as spanning edge nodes 205A-B and as an element of hypervisor 215, however as described above DR (or virtual DR (VDR)) is a logical router that is implemented by managed forwarding elements executing on the hosts that are not shown in FIG. 2. In some embodiments, DR 201 is configured to use as its default gateway the anycast inner IP address of the service routers 206A-B. In these embodiments, the anycast inner IP address is associated with the anycast MAC address and the anycast MAC address is associated with the anycast VTEP (outer) IP address. Configuring DR 201 to send packets to the anycast VTEP allows the underlying network to calculate the nearest node once the packet reaches the leaf switch 210C as discussed above.

VTEPs 202A-B are depicted as being part of pNICs 203A-B respectively because VTEPs advertise their availability on the IP address of the pNIC for the host machine. However, it is to be understood that in reality a VTEP is a function provided by a hypervisor or managed forwarding element on a hypervisor. Additionally, VTEPs are depicted as being connected to logical switch 1 to demonstrate that packets destined for the service routers on logical switch 1 are reachable by the VTEP acting on the same machine, and the VTEPs are also logically connected to any logical switch with DCNs running on the same machine or hypervisor.

Figure 3:
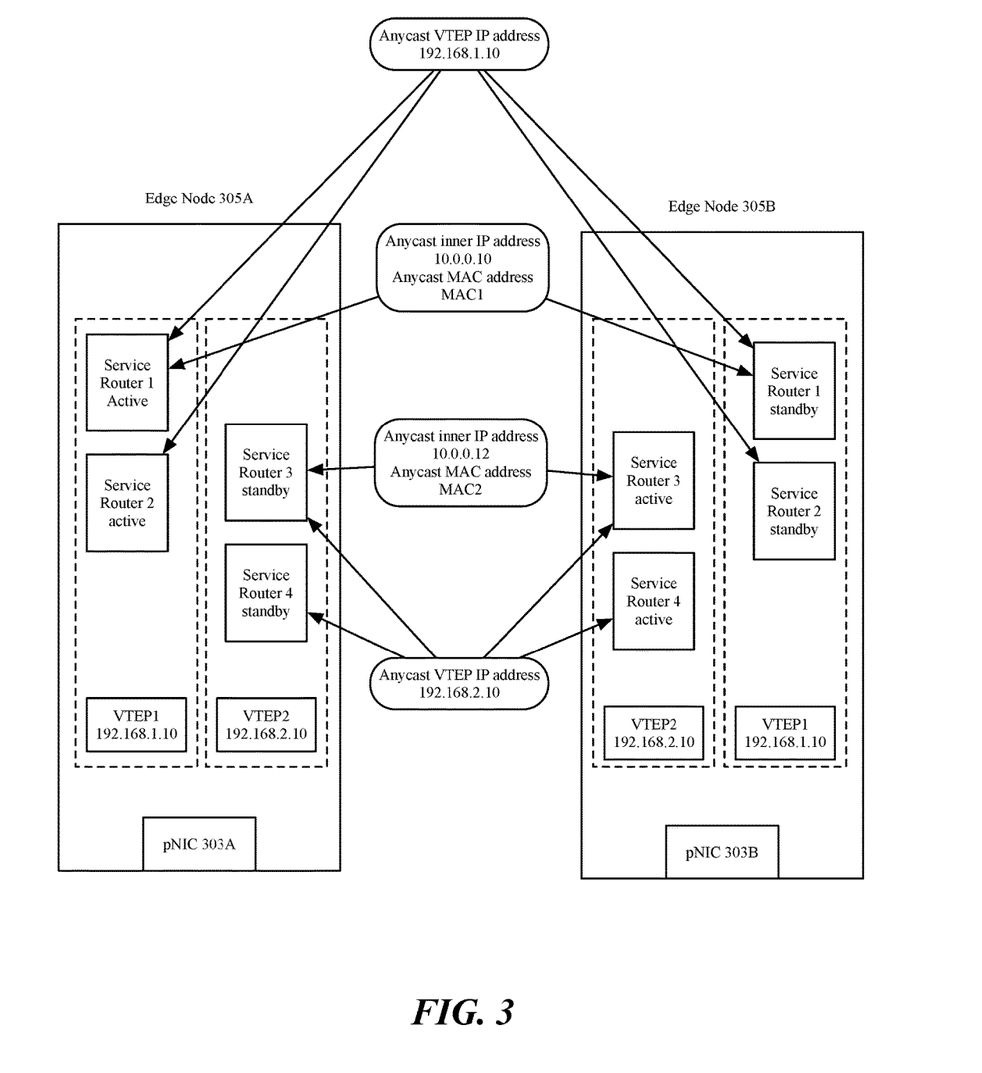
FIG. 3 illustrates a set of edge nodes implementing multiple pairs of service routers in active-standby mode using two anycast VTEP IP addresses.

FIG. 3 illustrates a configuration of edge nodes 305A-B on which multiple pairs of SRs execute. The use of two anycast VTEP addresses in some embodiments allows a single edge node to execute some SRs as active while other SRs are standby SRs. As in the example above, SR pairs in active-standby mode share anycast inner IP and MAC addresses (shown for SR 1 and SR 3) as well as anycast VTEP IP address. As shown, SR pairs that have the active SR on edge node 305A share VTEP1 as their anycast VTEP IP while SR pairs that have the active SR on edge node 305B share VTEP2 as their anycast VTEP IP. Such a configuration allows edge node 305A to advertise VTEP1 with higher preference and edge node 305B to advertise VTEP2 with higher preference such that the active SRs receive the traffic on both edge nodes.

Figure 4:
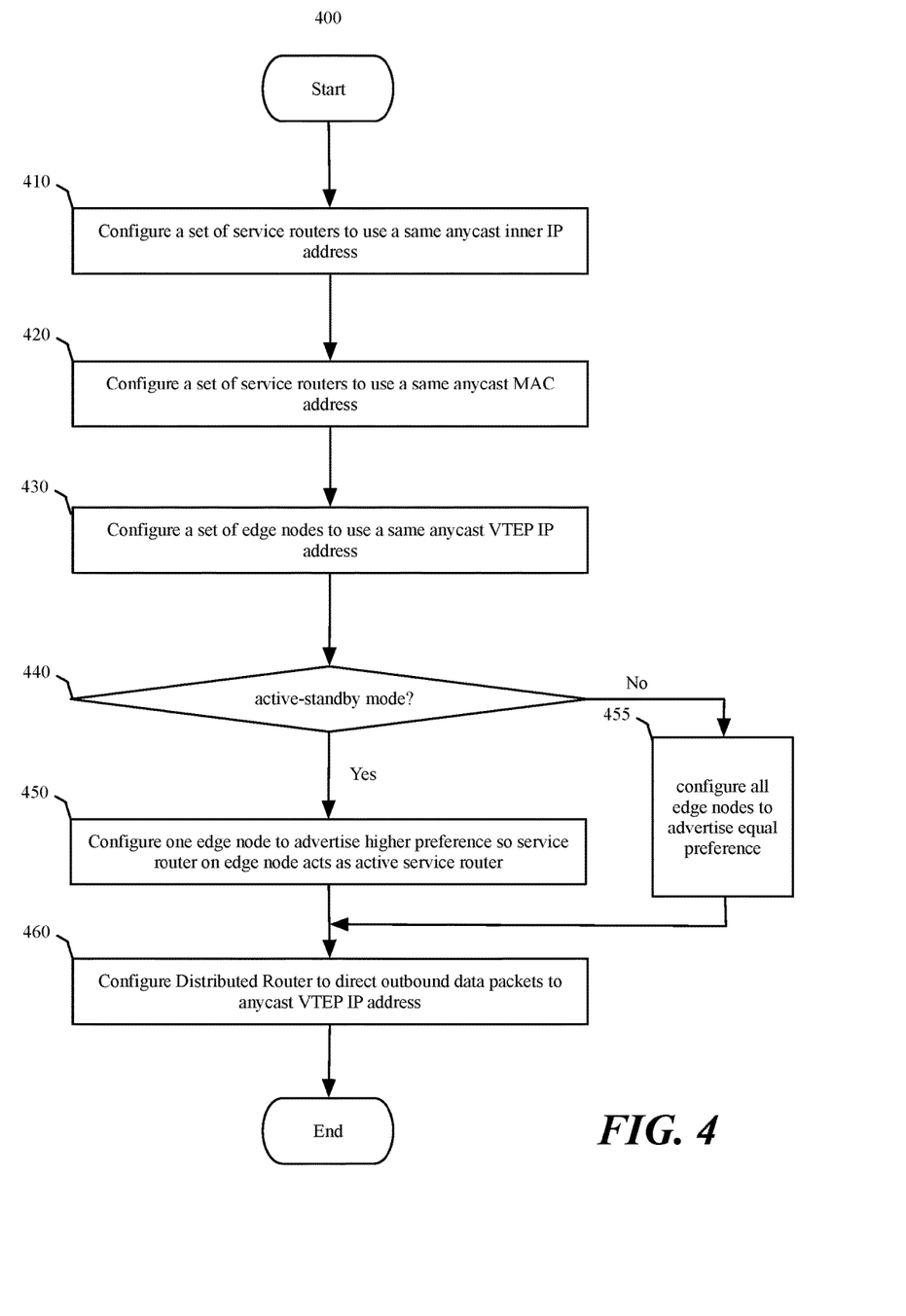
FIG. 4 conceptually illustrates a process of some embodiments for configuring service modules to implement the invention.

FIG. 4 conceptually illustrates a process 400 that implements the novel method of some embodiments of the invention. In some embodiments, the process 400 is performed by a central controller or central controller cluster that manages forwarding elements on different hosts to implement logical networks and distributed routers. The controller performs this process in some embodiments upon an initial configuration of service routers and in other embodiments in response to a change in the network settings.

As shown, process 400 begins when a controller configures (at 410) a set of service routers to use a same anycast inner IP address. The anycast inner IP address is found in the inner packet header that is encapsulated according to a tunneling protocol (e.g., GRE, VXLAN, etc.). The process 400 then configures (at 420) the set of service routers to use a same anycast MAC address.

Process 400 continues by configuring (at 430) a set of edge nodes to use a same anycast VTEP (outer) IP address. One of ordinary skill in the art will appreciate that a VTEP IP address is just one example of an outer IP address that may be used in a tunneling protocol and that other outer IP addresses would function in similar manners. It is to be understood that the steps 410-430 may be performed in any order and that the separate steps are not dependent on one another.

The process determines (at 440) whether the service routers are to be configured in active-standby mode or in active-active mode. If the service routers are to be configured in active-standby mode, the process configures (at 450) the edge router on which the active service router executes to advertise the VTEP IP address with higher preference (e.g. lower administrative cost). If the process determines (at 440) that the service routers should be configured in active-active mode, the process (at 455) configures the edge nodes to advertise the VTEP IP address with a same preference (e.g., same administrative cost).

In both active-active and active-standby modes the process configures (at 460) distributed routers to use the anycast VTEP IP address to send outbound packets. As noted above in the discussion of FIG. 2, in some embodiments the process configures the default route of the DR to direct packets to the anycast inner IP address by associating the anycast inner IP address with the anycast MAC address and anycast VTEP IP address used by the service router.

Figure 5:
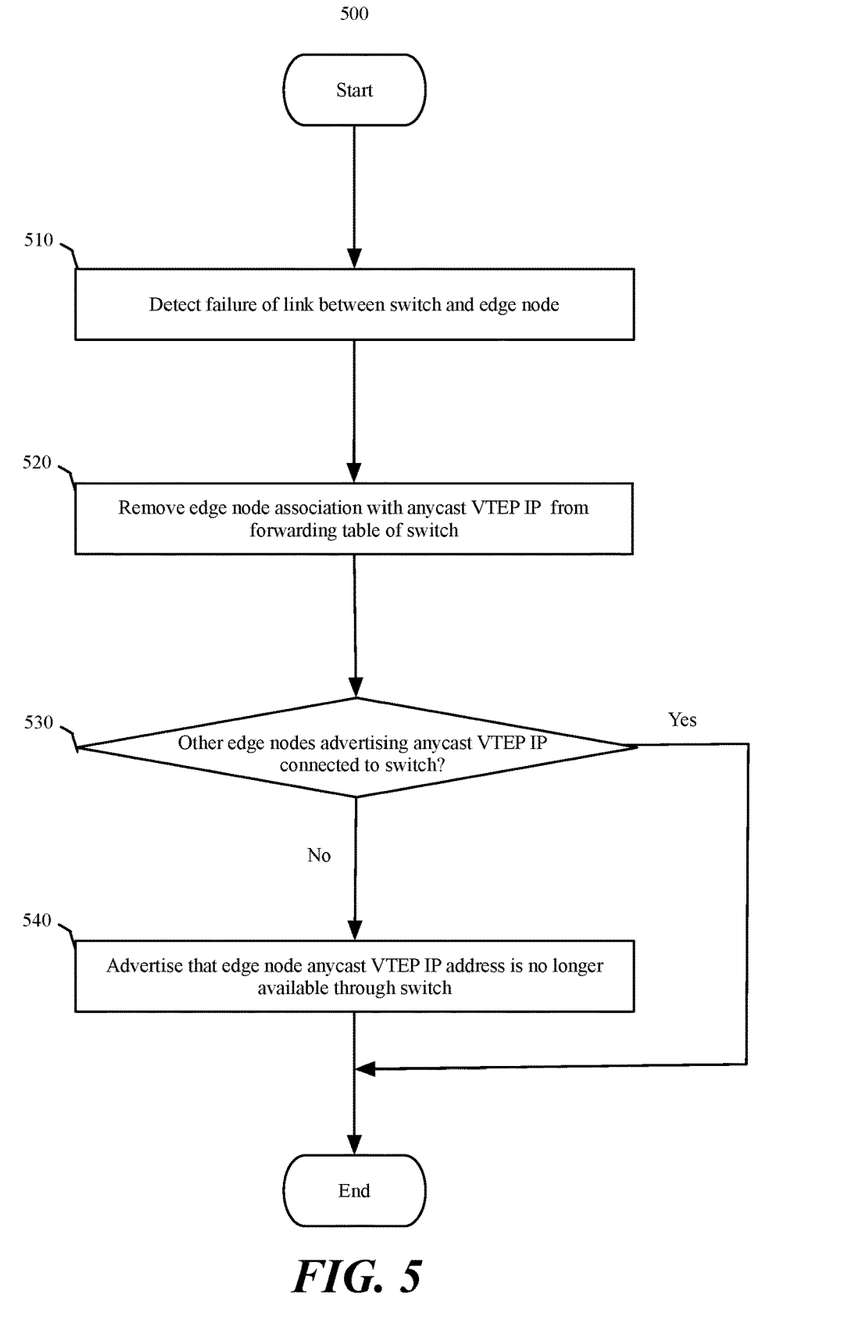
FIG. 5 conceptually illustrates a process of some embodiments for implementing redundancy in case of service router failure.

FIG. 5 conceptually illustrates a process 500 that implements the novel method of some embodiments of the invention. The process 500 in some embodiments is implemented by a leaf switch that is connected to an edge node on which an active service router is executing. The process allows fast detection of service-router unavailability (e.g., link between leaf switch and edge node fails, failure of edge node, etc.). Process 500 assumes that a bidirectional forwarding detection (BFD) or similar protocol for monitoring the status of the connection between the leaf switch and an edge node hosting a service router or routers has been established.

Process 500 begins by detecting (at 510) that a connection between a switch and an edge node has failed. In some embodiments, the connection is between a leaf switch and the edge node executing the active service router. One of ordinary skill in the art will recognize that the detection could be placed along any link that would leave the service router unavailable to other machines on the network.

Process 500 continues by having the switch remove (at 520) the association between the edge node and the anycast VTEP IP address from the forwarding table of the switch (e.g., based on a routing protocol). The switch no longer forwards packets with the anycast VTEP IP address to the edge node and the process proceeds to step 530.

Process 500 then determines (at 530) whether the anycast VTEP IP is still accessible on other machines (edge nodes) connected to the switch. If no other edge nodes connected to the switch advertise the availability of the anycast VTEP IP, then the process advertises (at 540) that the anycast VTEP IP is no longer available through the switch. Once this information is propagated through the DC fabric using a dynamic routing protocol, the underlying network begins sending packets to the next available service router (e.g., the standby router) and the process ends. If there are still edge nodes connected to the switch advertising the availability of the anycast VTEP IP, the switch does not need to advertise that the anycast VTEP IP address is not available through the switch and the process ends.

Figure 6:
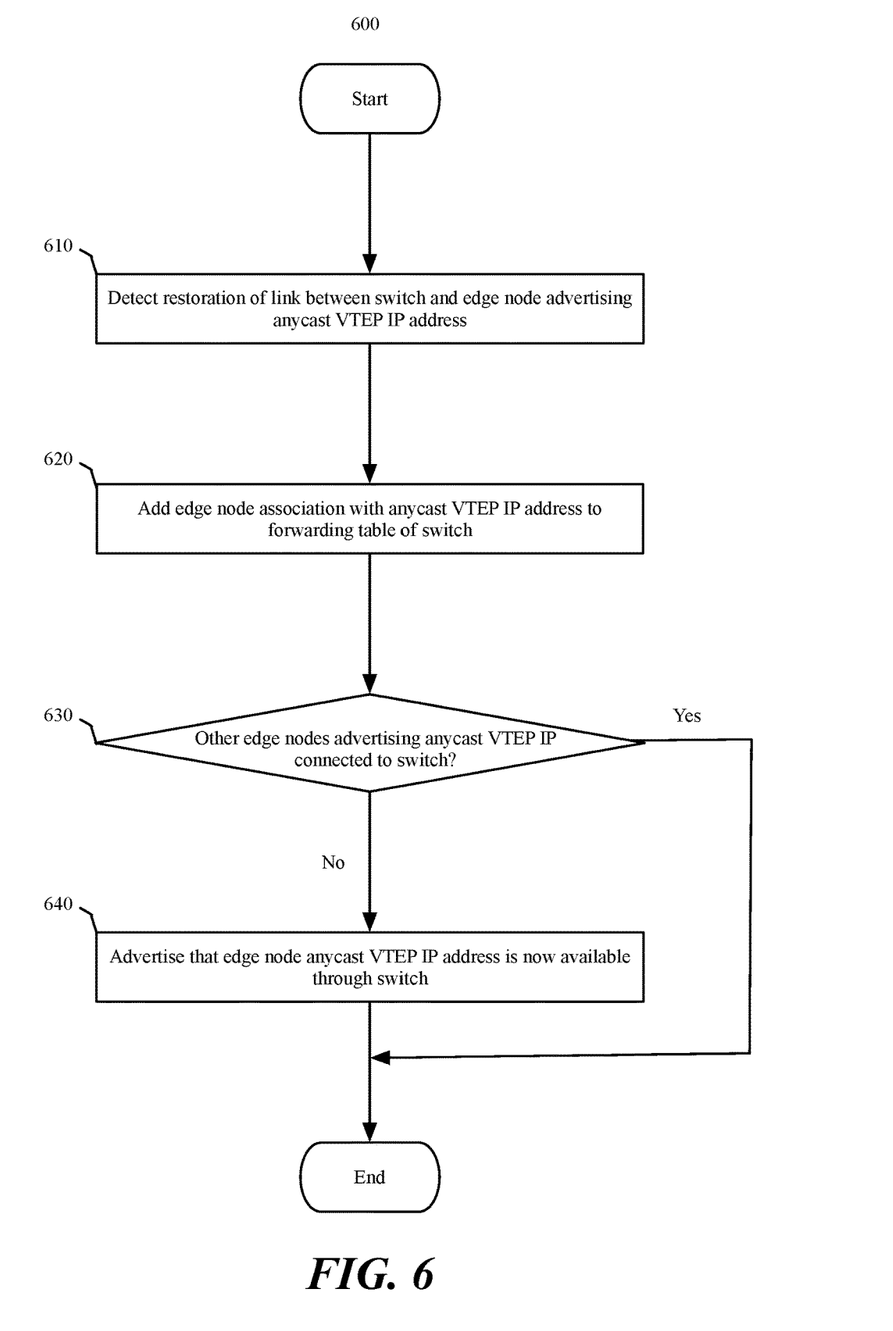
FIG. 6 conceptually illustrates a process of some embodiments for implementing redundancy when service router comes back online.

FIG. 6 conceptually illustrates a process 600 that allows a previously active service router to come back online as the active service router when availability is restored. The process 600 in some embodiments is implemented by a leaf switch that is connected to an edge node on which a formerly-active service router executes.

Process 600 begins by detecting (at 610) that a connection between a switch and an edge node has been restored. In some embodiments, the connection is between a leaf switch and the edge node executing the formerly-active service router. One of ordinary skill in the art will recognize that the detection could be placed along any link that would leave the service router unavailable to other machines on the network.

Process 600 continues by having the switch add (at 620) the association between the edge node and the anycast VTEP IP address to the forwarding table of the switch (e.g., based on a routing protocol). The addition in some embodiments is based on receiving an advertisement from the edge node that the anycast VTEP IP is available over the restored link. In some embodiments, the switch now forwards packets with the anycast VTEP IP address to the restored edge node and the process proceeds to step 630.

Process 600 then determines (at 630) whether the anycast VTEP IP was accessible on other machines (edge nodes) connected to the switch before the restoration of the connection. If no other edge nodes connected to the switch advertise the availability of the anycast VTEP IP, then the process advertises (at 640) that the anycast VTEP IP is now available through the switch. Once this information is propagated through the DC fabric using a dynamic routing protocol, the underlying network begins sending packets to the restored service router (e.g., the failed and restored active service router) and the process ends. If there were still edge nodes connected to the switch advertising the availability of the anycast VTEP IP, the switch does not need to advertise that the anycast VTEP IP address is now available through the switch and the process ends. In some embodiments, the edge node with the restored connection advertises the anycast VTEP IP address with higher preference as it had been doing before the failure and restoration.

Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
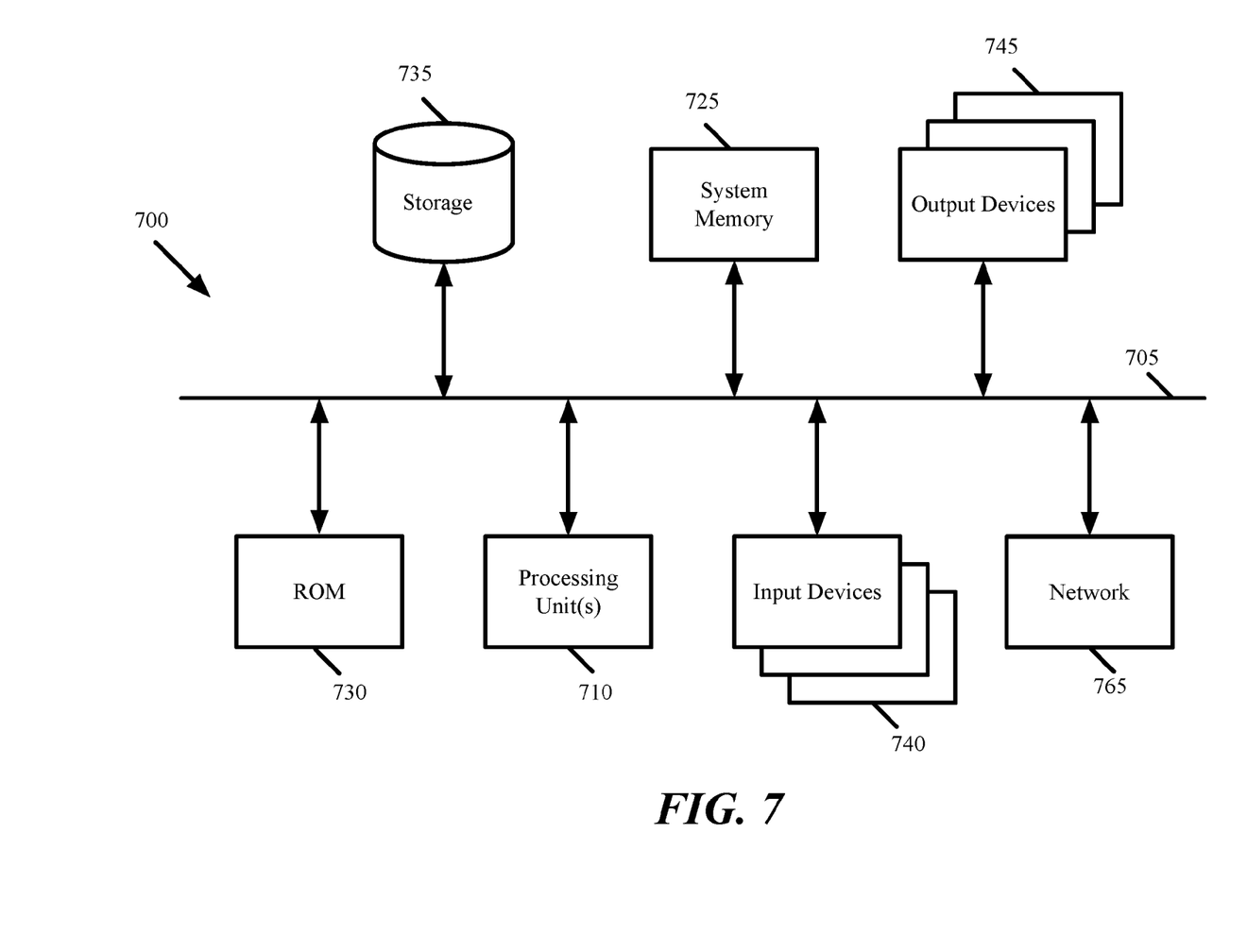
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for providing redundancy in a virtualized environment comprising:
   configuring a plurality of service routers executing on a plurality of edge nodes to use a same anycast inner internet protocol (IP) address, wherein a first service router of the plurality of service routers is configured as an active service router;
   configuring the plurality of edge nodes to use a same anycast virtual extensible local area network tunnel end point (VTEP) IP address,
      wherein a first edge node in the plurality of edge nodes on which the first service router executes advertises the anycast VTEP IP address with higher preference than other edge nodes on which service routers in the plurality of service routers execute,
      wherein upon failure of the connection to the first service router, the anycast VTEP IP address is advertised as unavailable at the first edge node and traffic to the anycast VTEP IP address is directed to a second, standby service router acting as a current, active service router in the plurality of service routers, wherein a second edge node on which the second service router executes advertises the anycast VTEP IP address with higher preference,
      wherein upon recovery of the first service router, the anycast VTEP IP address is advertised as available at the first edge node with higher preference than the second edge node; and
   configuring managed forwarding elements executing on host machines and implementing a distributed router to use the anycast inner IP address of the plurality of service routers as a default gateway.

2. The method of claim 1, wherein the failure of the first service router is detected by a fault detection protocol along a path from the first edge node to a hardware switch.

3. The method of claim 2 wherein the fault detection protocol is a bidirectional forwarding detection protocol.

4. A method for providing redundancy in a virtualized environment comprising:
   configuring a plurality of service routers executing on a plurality of edge nodes to use a same anycast inner internet protocol (IP) address, wherein a first service router of the plurality of service routers is configured as an active service router;
   configuring the plurality of edge nodes to use a same anycast virtual extensible local area network tunnel end point (VTEP) IP address,
      wherein a particular edge node in the plurality of edge nodes on which the active service router executes advertises the anycast VTEP IP address with higher preference than other edge nodes on which service routers in the plurality of service routers execute,
      wherein the first service router executes on a first edge node,
      wherein, upon detection of a failure of the connection to the first service router by a fault detection protocol along a path from the first edge node to a leaf hardware switch in a leaf spine network topology, traffic to the anycast VTEP IP address is directed to a second, standby service router acting as a current, active service router in the plurality of service routers; and
   configuring a distributed router to use the anycast inner IP address of the plurality of service routers as a default gateway.

5. The method of claim 4, wherein, upon failure of the connection to the first service router, the anycast VTEP IP address is advertised as unavailable at the first edge node.

6. The method of claim 4, wherein configuring the distributed router to use the anycast inner IP address of the plurality of service routers as the default gateway comprises configuring the distributed router to associate the inner anycast IP address of the plurality of service routers with the anycast VTEP IP address.

7. A method for providing redundancy in a virtualized environment comprising:
   configuring a plurality of service routers executing on a plurality of edge nodes to use a same anycast inner internet protocol (IP) address, wherein a first service router of the plurality of service routers is configured as an active service router;
   configuring the plurality of edge nodes to use a same anycast virtual extensible local area network tunnel end point (VTEP) IP address,
      wherein a particular edge node in the plurality of edge nodes on which the active service router executes advertises the anycast VTEP IP address with higher preference than other edge nodes on which service routers in the plurality of service routers execute,
      wherein upon failure of the connection to the first service router, traffic to the anycast VTEP IP address is directed to a second, standby service router acting as a current, active service router in the plurality of service routers, and
      wherein upon failure of the connection to the first service router, the anycast VTEP IP address is advertised as unavailable at the particular edge node when the first service router was the only service router using the anycast inner IP executing on the particular edge node; and
   configuring a distributed router to use the anycast inner IP address of the plurality of service routers as a default gateway.

8. The method of claim 7, wherein, upon recovery of the first service router, the anycast VTEP IP address is advertised as available at the first edge node.

9. The method of claim 8 wherein the first edge node advertises the availability with higher preference than a second edge node on which the second, standby service router acting as the current, active service router executes.

10. The method of claim 7, wherein configuring the distributed router to use the anycast inner IP address of the plurality of service routers as the default gateway comprises:
   configuring the distributed router to associate the inner anycast IP address of the plurality of service routers with the anycast VTEP IP address.

11. A non-transitory machine readable medium storing a program which when executed by at least one processing unit provides redundancy in a virtualized environment, the program comprising sets of instructions for:
   configuring a plurality of service routers executing on a plurality of edge nodes to use a same anycast inner internet protocol (IP) address, wherein a first service router of the plurality of service routers is configured as an active service router;

configuring the plurality of edge nodes to use a same anycast virtual extensible local area network tunnel end point (VTEP) IP address,
  wherein a first edge node in the plurality of edge nodes on which the first service router executes advertises the anycast VTEP IP address with higher preference than other edge nodes on which service routers in the plurality of service routers execute,
  wherein upon failure of the connection to the first service router, the anycast VTEP IP address is advertised as unavailable at the first edge node and traffic to the anycast VTEP IP address is directed to a second, standby service router acting as a current, active service router in the plurality of service routers, wherein a second edge node on which the second service router executes advertises the anycast VTEP IP address with higher preference,
  wherein upon recovery of the first service router, the anycast VTEP IP address is advertised as available at the first edge node with higher preference than the second edge node; and configuring managed forwarding elements executing on host machines and implementing a distributed router to use the anycast inner IP address of the plurality of service routers as a default route.

12. The machine readable medium of claim 11 wherein the failure of the first service router is detected by a fault detection protocol along a path from the first edge node to a hardware switch.

13. The machine readable medium of claim 12 wherein the fault detection protocol is a bidirectional forwarding detection protocol.

14. A non-transitory machine readable medium storing a program which when executed by at least one processing unit provides redundancy in a virtualized environment, the program comprising sets of instructions for:

configuring a plurality of service routers executing on a plurality of edge nodes to use a same anycast inner internet protocol (IP) address, wherein a first service router of the plurality of service routers is configured as an active service router;

configuring the plurality of edge nodes to use a same anycast virtual extensible local area network tunnel end point (VTEP) IP address,
  wherein a particular edge node in the plurality of edge nodes on which the active service router executes advertises the anycast VTEP IP address with higher preference than other edge nodes on which service routers in the plurality of service routers execute,
  wherein the first service router executes on a first edge node,
  wherein upon detection of a failure of the connection to the first service router by a fault detection protocol along a path from the first edge node to a leaf hardware switch in a leaf spine network topology, traffic to the anycast VTEP IP address is directed to a second, standby service router acting as a current, active service router in the plurality of service routers; and configuring a distributed router to use the anycast inner IP address of the plurality of service routers as a default gateway.

15. The machine readable medium of claim 14, wherein the set of instructions for configuring the distributed router to use the anycast inner IP address of the plurality of service routers as the default gateway comprises a set of instructions for configuring the distributed router to associate the inner anycast IP address of the plurality of service routers with the anycast VTEP IP address.

16. The machine readable medium of claim 14, wherein the fault detection protocol is a bidirectional forwarding detection protocol.

17. A non-transitory machine readable medium storing a program which when executed by at least one processing unit provides redundancy in a virtualized environment, the program comprising sets of instructions for:

configuring a plurality of service routers executing on a plurality of edge nodes to use a same anycast inner internet protocol (IP) address, wherein a first service router of the plurality of service routers is configured as an active service router;

configuring the plurality of edge nodes to use a same anycast virtual extensible local area network tunnel end point (VTEP) IP address,
  wherein a particular edge node in the plurality of edge nodes on which the active service router executes advertises the anycast VTEP IP address with higher preference than other edge nodes on which service routers in the plurality of service routers execute,
  wherein upon failure of the connection to the first service router, traffic to the anycast VTEP IP address is directed to a second, standby service router acting as a current, active service router in the plurality of service routers, and
  wherein upon failure of the connection to the first service router, the anycast VTEP IP address is advertised as unavailable at the particular edge node when the first service router was the only service router using the anycast inner IP executing on the particular edge node; and configuring a distributed router to use the anycast inner IP address of the plurality of service routers as a default gateway.

18. The machine readable medium of claim 17 wherein, upon recovery of the first service router, the anycast VTEP IP address is advertised as available at the first edge node.

19. The machine readable medium of claim 18 wherein the first edge node advertises the availability with higher preference than a second edge node on which the second, standby service router acting as the current, active service router executes.

20. The machine readable medium of claim 17, wherein the set of instructions for configuring the distributed router to use the inner anycast IP address of the plurality of service routers as the default gateway further comprises a set of instructions for configuring the distributed router to associate the anycast inner IP address of the plurality of service routers with the anycast VTEP IP address.

* * * * *